US011674002B2

(12) United States Patent
Galla et al.

(10) Patent No.: US 11,674,002 B2
(45) Date of Patent: Jun. 13, 2023

(54) LOW COMPRESSION SET THERMOPLASTIC GEL AND CABLE GEL SEAL ARRANGEMENT

(71) Applicant: COMMSCOPE TECHNOLOGIES LLC, Hickory, NC (US)

(72) Inventors: Matthew Peter Galla, Holly Springs, NC (US); Gary William Adams, Holly Springs, NC (US); Christiaan Radelet, Aarschot (BE); Thierry Mike Declerck, Kumtich (BE); Danny Willy August Verheyden, Gelrode (BE); Wouter Vandamme, Sint Amandsberg (BE); Roel Modest Willy Bryon, Aarschot (BE); Pieter Arthur Anna De Vos, Berchem (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 400 days.

(21) Appl. No.: 16/753,147

(22) PCT Filed: Oct. 1, 2018

(86) PCT No.: PCT/US2018/053750
§ 371 (c)(1),
(2) Date: Apr. 2, 2020

(87) PCT Pub. No.: WO2019/070578
PCT Pub. Date: Apr. 11, 2019

(65) Prior Publication Data
US 2020/0255602 A1 Aug. 13, 2020

Related U.S. Application Data

(60) Provisional application No. 62/566,882, filed on Oct. 2, 2017.

(51) Int. Cl.
*C08J 3/02* (2006.01)
*C08J 3/09* (2006.01)
*C08J 3/00* (2006.01)

(52) U.S. Cl.
CPC ............... *C08J 3/092* (2013.01); *C08J 3/005* (2013.01); *C08J 2353/02* (2013.01); *C08J 2445/02* (2013.01); *C08J 2471/12* (2013.01)

(58) Field of Classification Search
CPC ........ C08J 3/092; C08J 3/005; C08J 2353/02; C08J 2445/02; C08J 2471/12; C08J 2457/00; C08L 2205/025; C08L 2205/03; C08L 91/00; C08L 53/02
USPC .......................................................... 525/89
See application file for complete search history.

(56) References Cited

U.S. PATENT DOCUMENTS

| | | |
|---|---|---|
| 5,442,004 A | 8/1995 | Sutherland et al. |
| 5,541,250 A | 7/1996 | Hudson et al. |
| 5,618,882 A | 4/1997 | Hammond et al. |
| 5,710,206 A | 1/1998 | Francis et al. |
| 5,994,446 A | 11/1999 | Graulus et al. |
| 6,409,179 B1 | 6/2002 | Daoud |
| 6,802,512 B2 | 10/2004 | Muller et al. |
| 7,645,162 B2 | 1/2010 | Kadar-Kallen et al. |
| 7,758,389 B2 | 7/2010 | Kadar-Kallen et al. |
| 8,642,891 B2 | 2/2014 | Berghmans et al. |
| 8,967,888 B2 | 3/2015 | Van Den Berg et al. |
| 9,394,442 B2 | 7/2016 | Adams et al. |
| 9,556,336 B2 | 1/2017 | Berghmans et al. |
| 9,736,957 B2 | 8/2017 | Adams et al. |
| 10,316,152 B2 * | 6/2019 | Overdulve ............. C08K 3/013 |
| 2004/0068040 A1 | 4/2004 | Chen |
| 2004/0225063 A1 | 11/2004 | Clough et al. |
| 2006/0155044 A1 | 7/2006 | Joly et al. |
| 2010/0098962 A1 * | 4/2010 | Hanley .................... C09J 7/387 |
| | | 428/521 |
| 2016/0108228 A1 | 4/2016 | Sasaki et al. |
| 2022/0135801 A1 * | 5/2022 | Adams ................. C08L 53/025 |
| | | 524/106 |

FOREIGN PATENT DOCUMENTS

| | | |
|---|---|---|
| WO | 88/00603 A2 | 1/1988 |
| WO | 93/23472 A1 | 11/1993 |
| WO | 94/18273 A1 | 8/1994 |
| WO | 2018/048910 A2 | 3/2018 |

OTHER PUBLICATIONS

Extended European Search Report for European Application No. 18864136.9 dated Jun. 9, 2021, 7 pages.
International Search Report and Written Opinion of the International Searching Authority for International Patent Application No. PCT/US2018/053750 dated May 20, 2019, 11 pages.
Novares C 160, Reference-No. 145201, Technical Information, Rütgers Novares GmbH, 1 page (Sep. 2010).
Novares®, "Tailormade Hydrocarbon, Resins", Rütgers Novares GmbH, 4 pages (Mar. 2015).
Novares TN 170, Reference-No. 142101, Rütgers Novares GmbH, 1 page (Dec. 2015).
NORYL™ Resin SA120, Americas: Commercial, Saudi Basic industries Corporation (SABIC), 2 pages (2017).
"Standard Test Methods for Rubber Property-Compression Set1", Designation: D395—16ε1, ASTM International, 8 pages (Mar. 2017).

\* cited by examiner

*Primary Examiner* — Hannah J Pak
(74) *Attorney, Agent, or Firm* — Merchant & Gould, P.C.

(57) ABSTRACT

Disclosed herein are various cable gel seal arrangements and thermoplastic gels useful therein. The thermoplastic gels are prepared from a composition including a styrene triblock copolymer, a styrene diblock copolymer, an oil extender, and an additive selected from poly(2,6-dimethyl-1,4-phenylene oxide), a C9 resin, poly(alpha-methylstyrene), a coumarone-indene resin, and combinations thereof, wherein the additive has a $T_g$ from about 95° C. to about 200° C. The thermoplastic gels advantageously exhibit low compression set.

32 Claims, 12 Drawing Sheets

LOW COMPRESSION SET THERMOPLASTIC GEL AND CABLE GEL SEAL ARRANGEMENT

CROSS-REFERENCE TO RELATED APPLICATION

This application is a National Stage Patent Application of PCT/US2018/053750, filed on Oct. 1, 2018, which claims the benefit of U.S. Patent Application Ser. No. 62/566,882, filed on Oct. 2, 2017, the disclosures of which are incorporated herein by reference in their entireties. To the extent appropriate, a claim of priority is made to each of the above disclosed applications.

TECHNICAL FIELD

The present disclosure relates generally to a thermoplastic gel having low compression set. The present disclosure also relates generally to a cable gel seal arrangement suitable for use with a gel such as the thermoplastic gel disclosed herein.

BACKGROUND

Gel seal arrangements for fiber optic cables apply pressure to gel contained therein to causing the gel to conform to the fiber optic cables and overcome any penetrating fluid pressure (e.g., from air or water). Gels subject to pressure are subject to creep and compression set, especially at elevated temperature.

Typical gel seals for fiber optic cables are designed with a spring and mechanical structure to compensate for changes in gel volume and shape over the lifetime of the seal. Gel volume change is generally caused by loss of oil. Gel shape change is generally caused by creep of the gel.

There is a need for a gel seal arrangement that can accommodate different size cables. There is also a need for such a gel seal arrangement that has minimal components and, in particular, does not utilize a spring compensation mechanism.

There is also a need for an improved gel that has a low compression set and, therefore, is particularly suitable for use in a gel seal arrangement.

SUMMARY

One aspect of the present disclosure relates to a cable gel seal arrangement. The cable gel seal arrangement comprises a first sealing portion and a second sealing portion. The first sealing portion comprises first fingers extending away from a center line of the cable gel seal arrangement. The second sealing portion comprises second fingers extending opposite from the first fingers and away from the center line. A gel is located between the first sealing portion and the second sealing portion. The center line is located between the first sealing portion and the second sealing portion. The first fingers each comprise a first flex point at which the first fingers flex away from each other forming at least one first adjustable aperture to accommodate cables having different diameters. The second fingers each comprise a second flex point at which the second fingers flex away from each other forming at least one second adjustable aperture to accommodate cables having different diameters.

Another aspect of the present disclosure relates to a cable gel seal arrangement. The cable gel seal arrangement comprises a first sealing portion and a second sealing portion. The first sealing portion comprises first fingers extending away from a center line of the cable gel seal arrangement and converging toward a first apex or a first linear ridge as the first fingers extend away from the center line. The second sealing portion comprises second fingers extending opposite from the first fingers and away from the center line and converging toward a second apex or a second linear ridge as the second fingers extend away from the center line. A gel is located between the first sealing portion and the second sealing portion. The center line is located between the first sealing portion and the second sealing portion.

Yet another aspect of the present disclosure relates to a cable gel seal arrangement. The cable gel seal arrangement comprises a main gel volume comprising a gel. The cable gel seal arrangement further comprises a containment device containing the main gel volume. The containment device comprises fingers extending away from a center line of the main gel volume and converging towards each other forming an apex or a linear ridge as the fingers extend away from the center line of the main gel volume.

An aspect of the present disclosure relates to a cable gel seal arrangement. The cable gel seal arrangement comprises first and second containment structures. The first containment structure includes a first cone and the second containment structure includes a second cone. The first cone comprises a first set of fingers and the second cone comprises a second set of fingers. The cable gel seal arrangement also comprises a volume of gel contained within the first and second containment structures. The gel has at least a portion positioned within the first and second cones of the first and second containment structures.

A further aspect of the present disclosure relates to a cable gel seal arrangement. The cable gel seal arrangement comprises a first gel assembly and a second gel assembly. The first gel assembly comprises a first portion of a cone. The second gel assembly comprises a second portion of the cone cooperating with the first portion of the cone to define the cone. The cone comprises a set of fingers. The cable gel seal arrangement further comprises a volume of gel inside the cone.

Another aspect of the present disclosure relates to cable gel seal arrangement. The cable gel seal arrangement comprises a containment structure comprising a first half portion and a second half portion. The first half portion comprises a first set of fingers. The second half portion comprises a second set of fingers. The free ends of the fingers of the first set and the second set converge as the first and second sets of fingers extend towards an exterior of the cable gel seal arrangement. The cable gel seal arrangement further comprises a volume of gel between the fingers of the first set and the fingers of the second set.

Another aspect of the present disclosure relates to a thermoplastic gel prepared from a composition comprising: a styrene triblock copolymer; a styrene diblock copolymer; an oil extender; and an additive. The additive is selected from poly(2,6-dimethyl-1,4-phenylene oxide), a C9 resin, poly(alpha-methylstyrene), a coumarone-indene resin, and combinations thereof. The additive has a $T_g$ from about 95° C. to about 200° C.

DETAILED DESCRIPTION

Definitions

Figure 1:
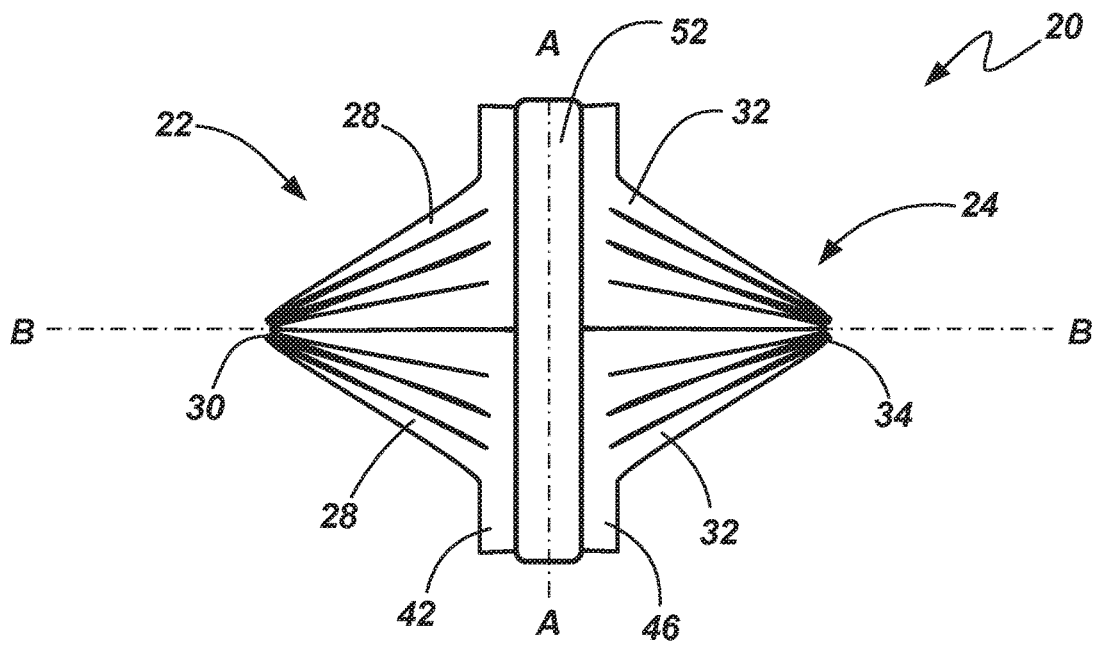
FIG. 1 is a side view of an embodiment of a cable gel seal arrangement disclosed herein.

As used herein, the term "additive" refers to poly(2,6-dimethyl-1,4-phenylene oxide), a C9 resin, poly(alpha-methylstyrene), or a coumarone-indene resin.

The term "poly(alpha-methylstyrene)" refers to a compound having the following structure:

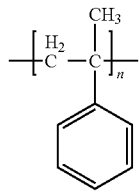

The term "C9 hydrocarbon" refers to an organic compound containing hydrogen and carbon and including 9 carbon atoms.

The term "C10 hydrocarbon" refers to an organic compound containing hydrogen and carbon and including 10 carbon atoms.

The term "unsaturated C9 fraction" refers to a hydrocarbon fraction containing a C9 hydrocarbon having one or more carbon-carbon double bonds or carbon-carbon triple bonds. The C9 hydrocarbon can be aliphatic or aromatic.

The term "C9 resin" refers to a thermoplastic hydrocarbon resin obtained from polymerizing constituents of a petroleum-derived unsaturated C9 fraction. As used herein, a "C9 resin" is produced from primarily (e.g., 90 wt % or greater or 95 wt % or greater) aromatic monomers. A "C9 resin" as used herein can, for example, be produced by polymerization of mixed dicyclopentadiene (DCPD), aromatic and alicyclic monomers. As another example, a "C9 resin" as used herein can be produced by polymerization of mixed aromatic monomers. As yet another example, a "C9 resin" as used herein can be produced by polymerizing a combination of aromatic C9 and C10 hydrocarbons. An exemplary "C9 resin" is Rütgers Novares TN 170.

The term "coumarone-indene resin" refers to a thermoplastic resin obtained by polymerization of a mixture comprising coumarone (i.e., benzofuran) and indene. An exemplary "coumarone-indene resin" as used herein is obtained by polymerization of a mixture containing about 90 wt % indene and about 10 wt % coumarone. An exemplary "coumarone-indene resin" as used herein is produced by polymerization of aromatic C9 and C10 hydrocarbons. An exemplary "coumarone-indene resin" is Rütgers Novares C 160.

As used herein, the terms "flex point", "first flex point", and "second flex point" refer to an area along the length of a finger at which the finger flexes or pivots. More particularly, the flex point is an area along the length of a finger at which the finger has a reduced cross-sectional area as compared to areas of the finger adjacent the flex point. For example, a flex point can include a notch, a thinned section of the finger, a section of the finger at which the finger is not reinforced with a rib, or a combination thereof.

As used herein, the terms "living hinge", "first living hinge", and "second living hinge" refer to a connecting element that is thinner and more flexible than the two adjacent fingers it connects.

The term "poly(2,6-dimethyl-1,4-phenylene oxide)" and the term "PPO" are used interchangeably herein. They refer to a compound having the structure, where "n" is an integer:

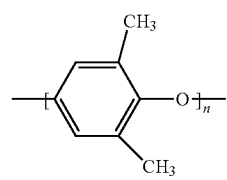

As used herein, the term "styrene diblock copolymer" refers to a diblock copolymer having a polystyrene segment and another elastomeric segment. Styrene diblock copolymers are known. Examples of a "styrene diblock copolymer" include poly(styrene-ethylene/propylene), poly(styrene-ethylene/butylene), and combinations thereof. Other examples of a "styrene diblock copolymer" include poly(styrene-butadiene) and poly(styrene-isoprene). The styrene diblock copolymer can have about 25 wt % to about 40 wt % styrene, for example between about 30 wt % and about 40 wt % styrene or between about 35 wt % and about 40 wt % styrene, for example, about 37 wt % styrene.

As used herein, the term "styrene triblock copolymer" refers to a triblock copolymer having polystyrene end segments and another elastomeric center segment. Styrene triblock copolymers are known. Examples of a "styrene triblock copolymer" include poly(styrene-butadiene-styrene) (SBS), poly(styrene-ethylene/butylene-styrene)

(SEBS), poly(styrene-ethylene/propylene-styrene) (SEPS), poly(styrene-ethylene/ethylene-propylene-styrene) (SEEPS), and combinations thereof. Another example of a "styrene triblock copolymer" is poly(styrene-isoprene-styrene) (SIS). The styrene triblock copolymer can have about 20 wt % to about 35 wt % styrene, for example, between about 20 wt % and about 25 wt % styrene, between about 25 wt % and about 35 wt % styrene, or between about 30 wt % and about 35 wt % styrene. For example, the styrene triblock copolymer can have about 20 wt % styrene, about 21 wt % styrene, or between about 30 wt % and about 33 wt % styrene. The weight average molecular weight ($M_w$) of the styrene triblock copolymer can be about 80,000 to about 400,000, for example, about 100,000 to about 400,000; about 100,000 to about 350,000; about 100,000 to about 300,000; about 150,000 to about 300,000; about 200,000 to about 300,000; or about 250,000 to about 300,000. Exemplary styrene triblock copolymers are Kraton™ G SEBS/SEPS polymers and Kraton™ ERS SEBS.

Cable Gel Seal Arrangement

Aspects of the present disclosure relate to cable gel seal arrangements having fingers facing outwardly from the gel sealing area. Outwardly facing fingers advantageously maintain the seal regardless of the direction of the pressure differential.

Aspects of the present disclosure relate to cable gel seal arrangements adjustably accommodating cables having different diameters. Additionally, aspects of the present disclosure relate to cable gel seal arrangements in which the fingers each include a flex point at which the fingers flex away from each other to form at least one adjustable aperture to accommodate cables having different diameters.

Aspects of the present disclosure also relate to cable gel seal arrangements that maintain sealing performance with minimal components. For example, no dummy plugs are necessary. Furthermore, aspects of the present disclosure relate to cable gel seal arrangements that do not require a separate spring compensation mechanism.

Aspects of the present disclosure further relate to cable gel seal arrangements that do not require extra space within the interiors of the arrangements for gel displacement.

Aspects of the present disclosure relate to a cable gel seal arrangement having a gel containment cone configuration. Aspects of the present disclosure also relate to a cable gel seal arrangement having a linear configuration.

In the following detailed description, reference is made to the accompanying drawings showing by way of illustration specific embodiments of cable gel seal arrangements disclosed herein. It is to be understood that other embodiments may be utilized and structural or logical changes may be made without departing from the scope of the present disclosure. The following detailed description, therefore, is not to be taken in a limiting sense.

Broadly, disclosed herein is a cable gel seal arrangement comprises a main gel volume comprising a gel. The cable gel seal arrangement further comprises a containment device containing the main gel volume. The containment device comprises fingers extending away from a center line of the main gel volume and converging towards each other forming an apex or a linear ridge as the fingers extend away from the center line of the main gel volume.

The fingers can each comprise a flex point at which the fingers flex away from each other forming at least one adjustable aperture to accommodate cables having different diameters. The fingers can taper as the fingers extend away from the center line of the main gel volume.

According to one aspect, the containment device comprises a cone configuration. According to this aspect, the containment device comprises a gel containment cone having the apex. The gel containment cone can comprise an upper portion and a lower portion in which the upper portion and the lower portion meet at a part line. In this manner, the upper portion and the lower portion are separable.

According to another aspect, the containment device comprises a linear configuration. According to this aspect, the fingers comprise an upper plurality of fingers and a lower plurality of fingers. The upper plurality of fingers and the lower plurality of fingers meet at the part line. Ends of each of the fingers of the upper plurality of fingers meet an end of a corresponding finger of the lower plurality of fingers forming the linear ridge. The fingers flex away from the linear ridge.

An elastic material can line each of the fingers. The fingers can be attached to each other with an elastic material extending between adjacent fingers. The fingers can be attached to each other with a living hinge extending between adjacent fingers.

Also disclosed herein is a cable gel seal arrangement comprising a first sealing portion, a second sealing portion, and a gel located between the first sealing portion and the second sealing portion. The first sealing portion comprises first fingers extending away from a center line of the cable gel seal arrangement. The center line is located between the first sealing portion and the second sealing portion. The first fingers converge toward a first apex or a first linear ridge as the first fingers extend away from the center line. The second sealing portion comprises second fingers extending opposite from the first fingers and away from the center line. The second fingers converge toward a second apex or a second linear ridge as the second fingers extend away from the center line.

Further disclosed herein is a cable gel seal arrangement comprising a first sealing portion, a second sealing portion, and a gel located between the first sealing portion and the second sealing portion. The first sealing portion comprises first fingers extending away from a center line of the cable gel seal arrangement. The center line is located between the first sealing portion and the second sealing portion. The second sealing portion comprises second fingers extending opposite from the first fingers and away from the center line. The first fingers each comprise a first flex point at which the first fingers flex away from each other forming at least one first adjustable aperture to accommodate cables having different diameters. The second fingers each comprise a second flex point at which the second fingers flex away from each other forming at least one second adjustable aperture to accommodate cables having different diameters.

The fingers can be plastic or metal. The plastic can contain a reinforcing filler (e.g., glass fiber). The metal can be a corrosion-resistant metal having elasticity.

The gel utilized in the cable gel seal arrangements disclosed herein can be, for example, gel with a low compression set (e.g., having a compression set less than 25%, less than 20%, or less than 15%). The gel utilized in the cable gel seal arrangements disclosed herein can be a thermoplastic gel as described herein. However, it should be recognized that gels other than low compression set gels and gels other than the thermoplastic gels described herein can be used in the cable gel seal arrangements disclosed herein.

FIGS. 1-7 illustrate an embodiment of a cable gel seal arrangement 20 disclosed herein having a gel containment cone configuration. With reference to FIGS. 1-7, the cable gel seal arrangement 20 has a first sealing portion 22 and a second sealing portion 24. A gel 26 is located between the first sealing portion 22 and the second sealing portion 24. The first sealing portion 22 includes first fingers 28 extending away from a center line A-A of the cable gel seal arrangement 20. As shown in FIG. 1, the center line A-A is located between the first sealing portion 22 and the second sealing portion 24. The second sealing portion 24 also includes second fingers 32 extending opposite from the first fingers 28. Like the first fingers 28, the second fingers 32 also extend away from the center line A-A.

Figure 6:
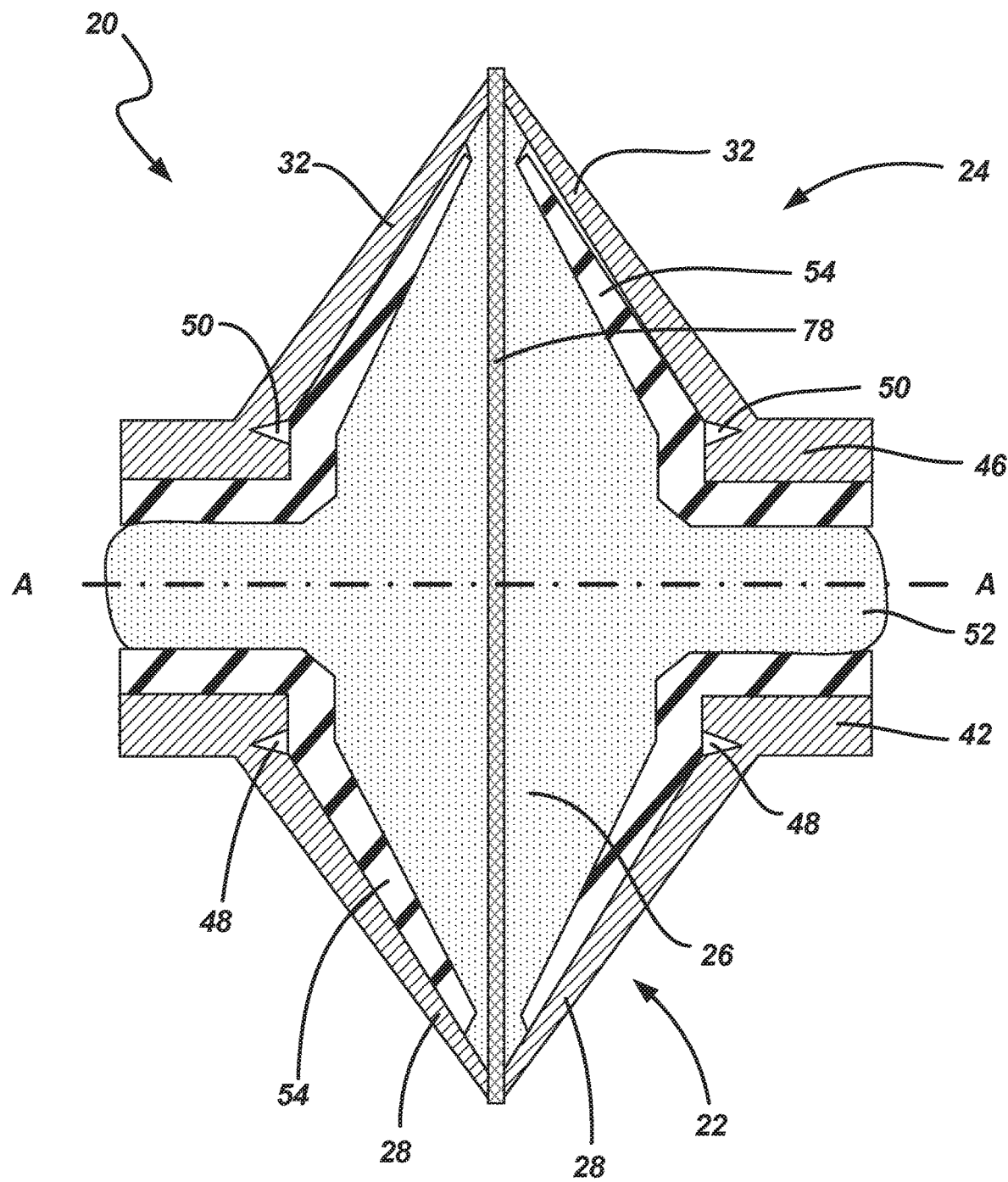
FIG. 6 is a cross-sectional view of the embodiment of the cable gel seal arrangement of FIG. 1, which depicts a small diameter cable therein.
Figure 7:
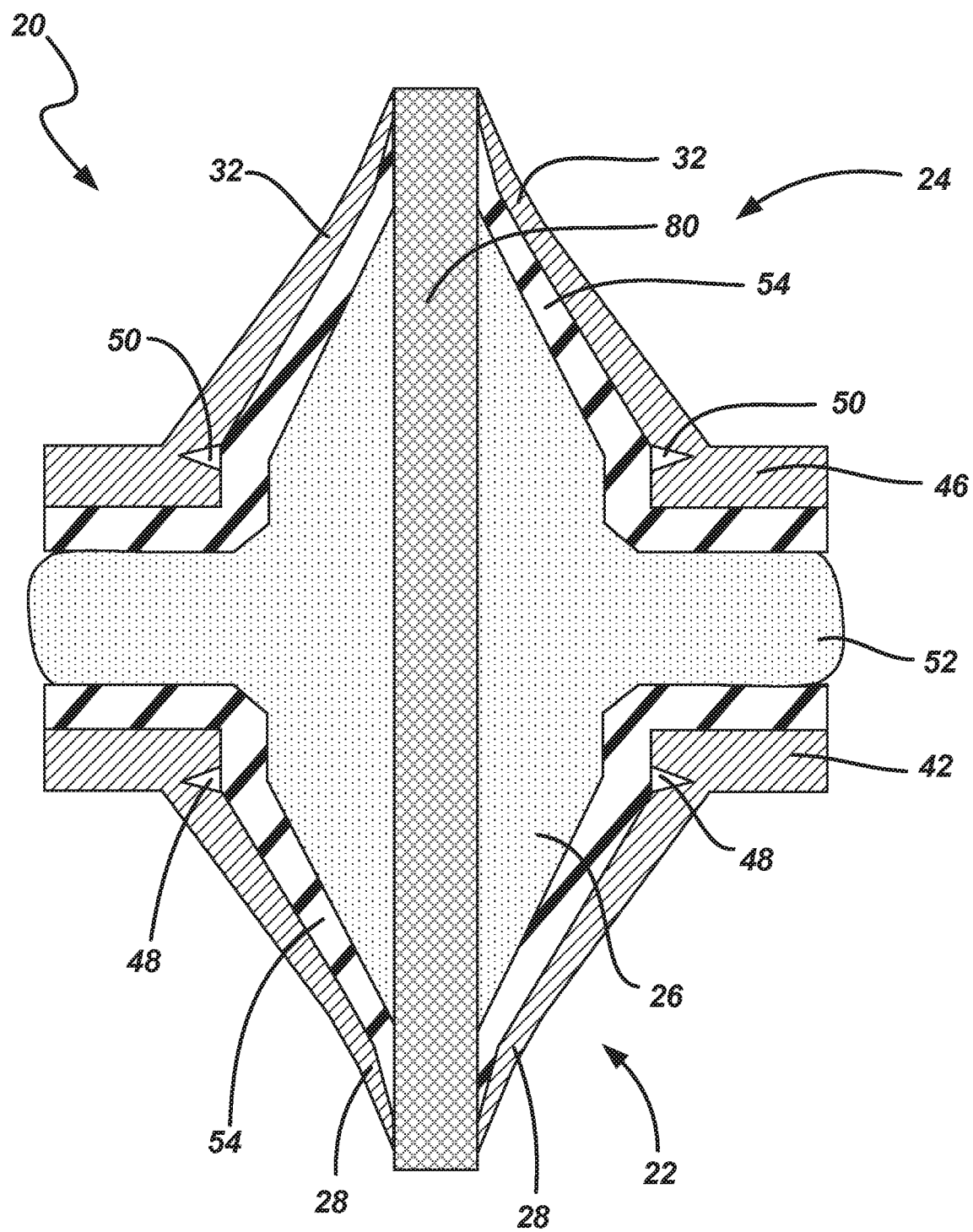
FIG. 7 is a cross-sectional view of the embodiment of the cable gel seal arrangement of FIG. 1, which depicts a larger diameter cable therein.

As shown in FIGS. 6 and 7, the first fingers 28 taper as they extend away from the center line A-A of the cable gel seal arrangement 20. Similarly, the second fingers 32 taper as they extend away from the center line A-A of the cable gel seal arrangement 20.

As illustrated in FIGS. 6 and 7, the first fingers 28 each comprise a first flex point 48 at which the first fingers 28 flex away from each other forming at least one first adjustable aperture 38 (see FIG. 3A) to accommodate cables having different diameters. Similarly, the second fingers 32 each comprise a second flex point 50 at which the second fingers 32 flex away from each other forming at least one second adjustable aperture 39 (see FIG. 3B) to accommodate cables having different diameters.

Figure 4A:
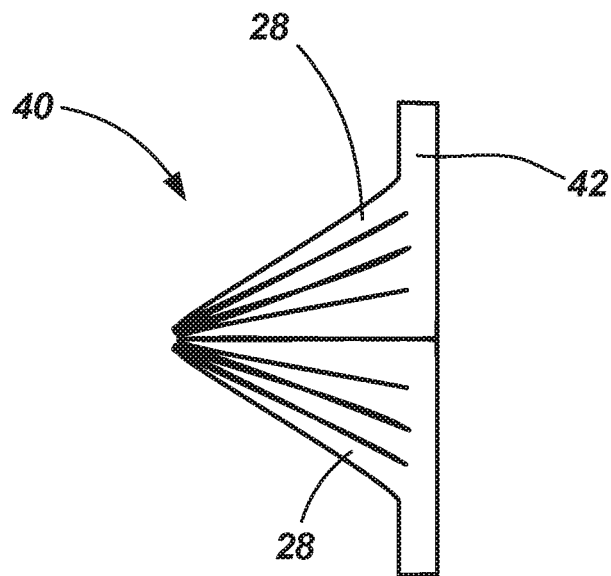
FIG. 4A is a side view of a first sealing portion of the embodiment of the cable gel seal arrangement of FIG. 1.

Referring to FIG. 4A, the first sealing portion 22 includes a first gel containment cone 40 having a first base 42. The first gel containment cone 40 comprises first fingers 28 projecting outwardly from the first base 42 from the center line A-A of the cable gel seal arrangement 20.

Figure 4B:
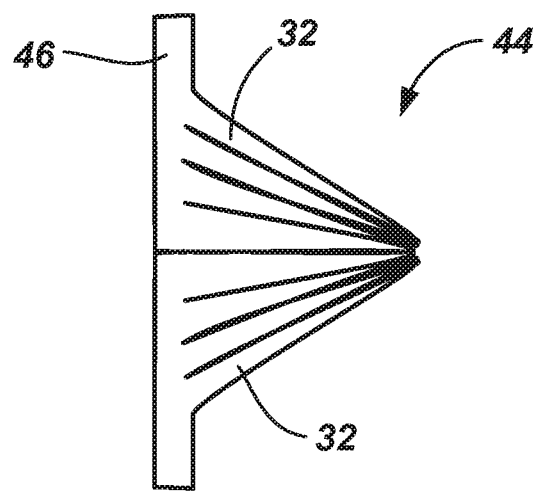
FIG. 4B is a side view of a second sealing portion of the embodiment of the cable gel seal arrangement of FIG. 1.
Figure 5:
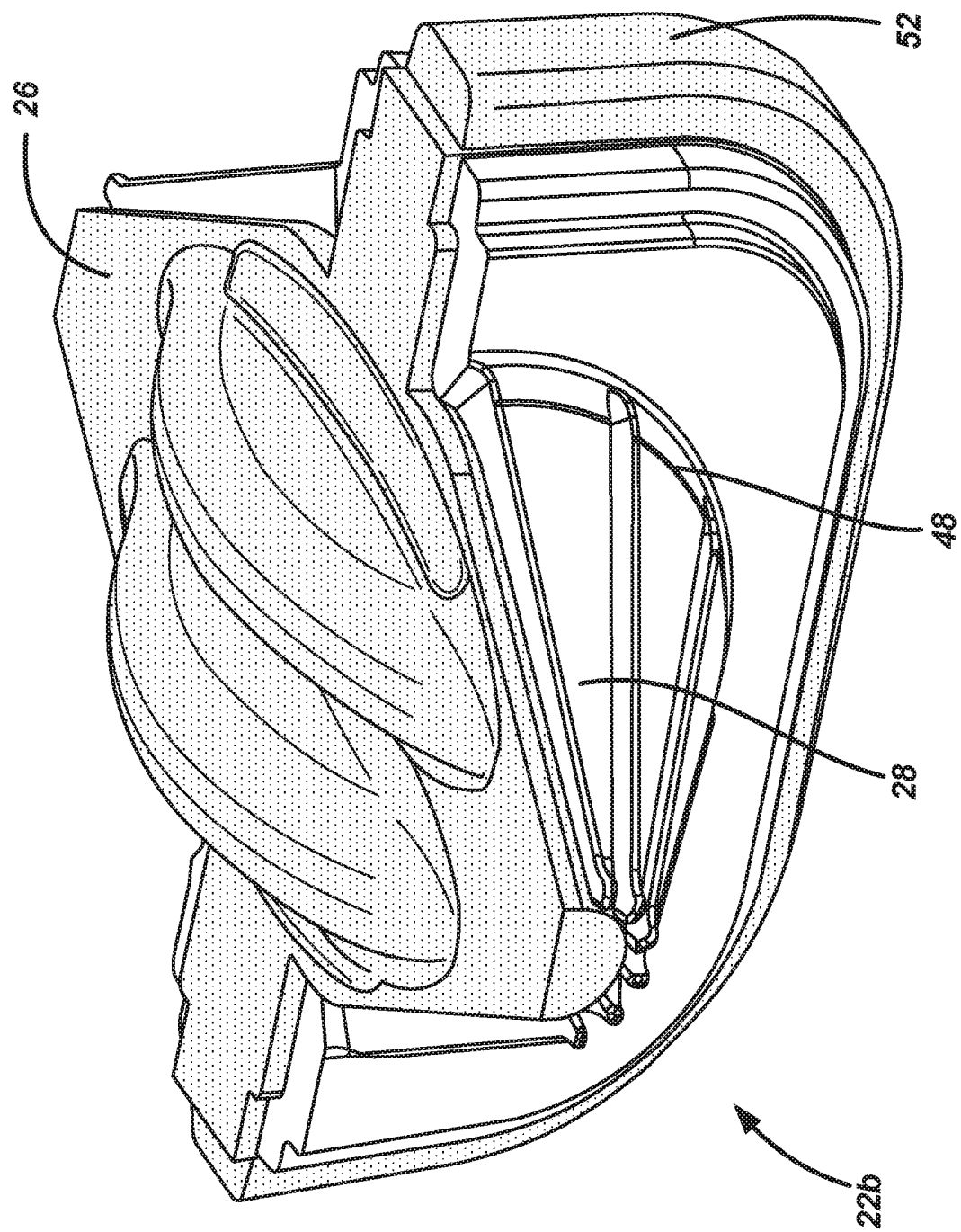
FIG. 5 is a perspective view of a first lower portion of the first sealing portion of FIG. 4A.

Turning to FIG. 4B, the second sealing portion 24 comprises a second gel containment cone 44 having a second base 46. The second gel containment cone 44 comprises the second fingers 32 projecting outwardly from the second base 46 from the center line A-A.

As apparent in FIG. 1, the center line A-A is located between the first base 42 and the second base 46.

As can be most readily seen in FIGS. 6 and 7, the first fingers 28 flex away from the first apex 30 of a first gel containment cone 40. The second fingers 32 flex away from the second apex 34 of a second gel containment cone 44.

Figure 2:
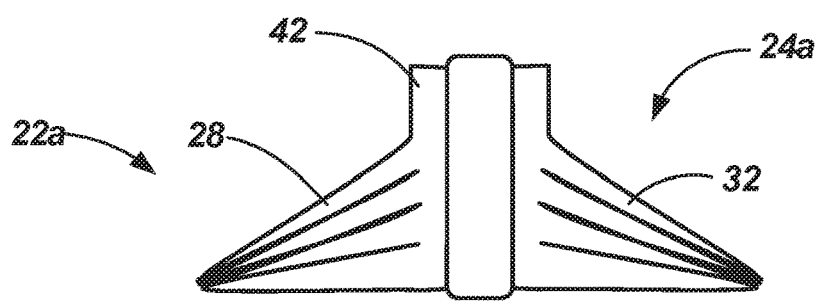
FIG. 2 shows the embodiment of the cable gel seal arrangement of FIG. 1 with the cable gel seal arrangement separated at a part line.
Figure 2:
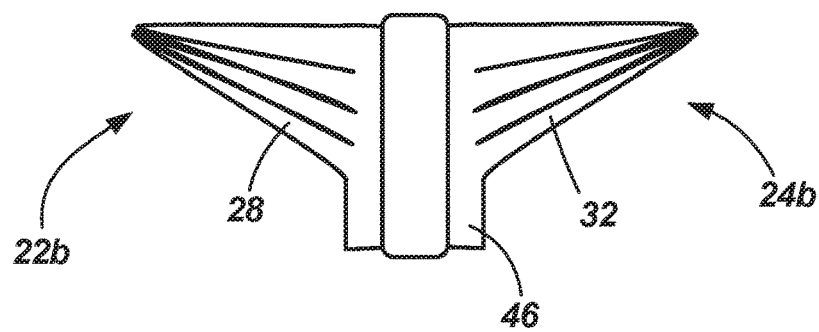
Figure 3A:
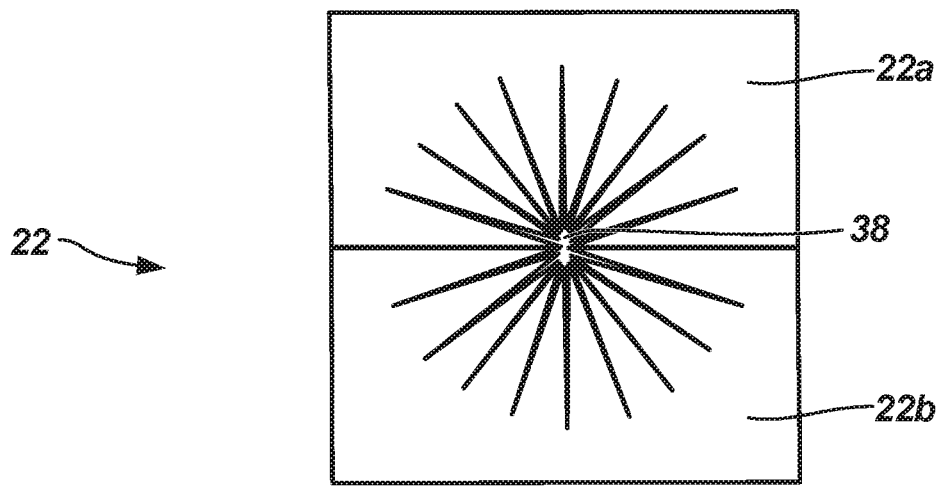
FIG. 3A shows a front view of the embodiment of the cable gel seal arrangement of FIG. 1.
Figure 3B:
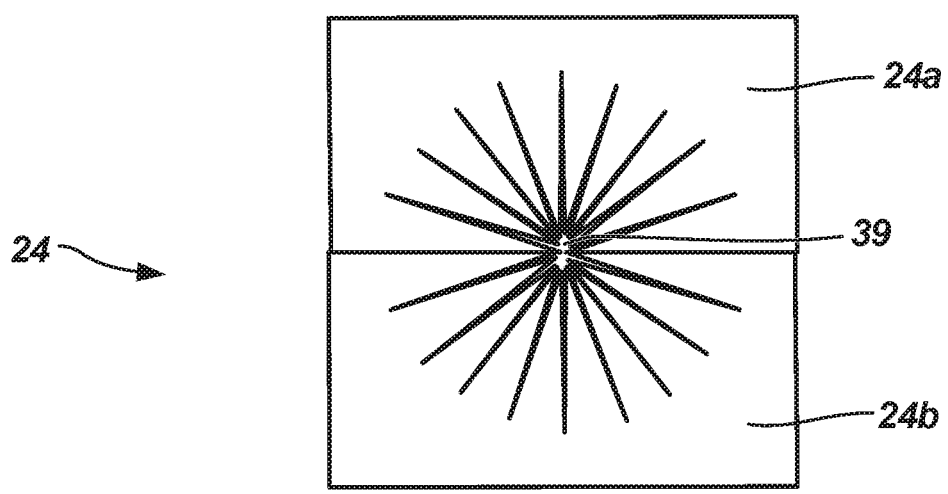
FIG. 3B shows a rear view of the embodiment of the cable gel seal arrangement of FIG. 1.

Referring to FIGS. 1 and 2, the first sealing portion 22 comprises a first upper portion 22a and a first lower portion 22b. The second sealing portion 24 comprises a second upper portion 24a and a second lower portion 24b. The first upper portion 22a and the first lower portion 22b meet at a part line B-B. Similarly, the second upper portion 24a and the second lower portion 24b meet at the part line B-B.

In use, the combination of the first lower portion 22b and the second lower portion 24b act as a base for receiving a cable (e.g., a fiber optic cable). The combination of the first upper portion 22a and the second upper portion 24a act as cover for covering the cable. The cable is placed into the first lower portion 22b and the second lower portion 24b. Then the first upper portion 22a and the second upper portion 24a, respectively, are placed over first lower portion 22b and the second lower portion 24b, respectively. The first and second fingers 28, 32 of the first and second upper portions 22a, 24a and the first and second lower portions 22b, 24b flex at the first and second flex points 48, 50 to accommodate the cable. In particular, the cable causes the first and second fingers 28, 32 to flex at the first and second flex points 48, 50. In this way, the first and second fingers 28, 32 form adjustable apertures 38, 39 that accommodate cables of various diameters. The first and second fingers 28, 32 having the first and second flex points 48, 50 provide the cable gel seal arrangement with adjustability without a separate spring compensation mechanism. Instead, the first and second fingers 28, 32 having the first and second flex points 48, 50 integrate a "spring" feature into the cable gel seal arrangement.

The first and second fingers 28, 32 having the first and second flex points 48, 50 also eliminate any need for extra space inside the cable gel seal arrangement to accommodate gel displaced by the cable. When the cable displaces the gel 26 inside the cable gel seal arrangement 20, the first and second fingers 28, 32 not only accommodate the cable, but also accommodate the gel displacement. In this manner, gel 26 displaced into the first and second gel containment cones 40, 44 is contained within the first and second gel containment cones 40, 44 and is generally not displaced outside of the cable gel seal arrangement 20.

FIGS. 6 and 7 illustrate how the first and second fingers 28, 32 flex at the first and second flex points 48, 50 thereby accommodating different sizes of cables and displacement of the gel 26 by the cables. FIG. 6 shows a relatively small diameter cable 78 within the cable gel seal arrangement 20 and passing through the adjustable apertures 38, 39. FIG. 7 shows a larger diameter cable 80 within the cable gel seal arrangement 20.

Turning back to FIG. 2, the cable gel seal arrangement 20 further includes a gel perimeter seal 52 between the first sealing portion 22 and the second sealing portion 24. As shown, the gel perimeter seal 52 seals the outer portion of the cable seal arrangement 20 between the first base 42 and the second base 46.

Turning back to FIGS. 6 and 7, the first and second fingers 28, 32 can each be lined with an elastic material 54 such that the elastic material extends between adjacent fingers. The elastic material 54 lining the first and second fingers 28, 32 and extending between adjacent fingers helps to prevent the gel from exiting the cable gel seal arrangement 20. The elastic material 54 can be, for example, rubber. This assists with gel containment.

The first fingers can be attached to each other with a first living hinge (not shown) extending between adjacent first fingers. Similarly, the second fingers can be attached to each other with a second living hinge (now shown) extending between adjacent second fingers.

Figure 8:
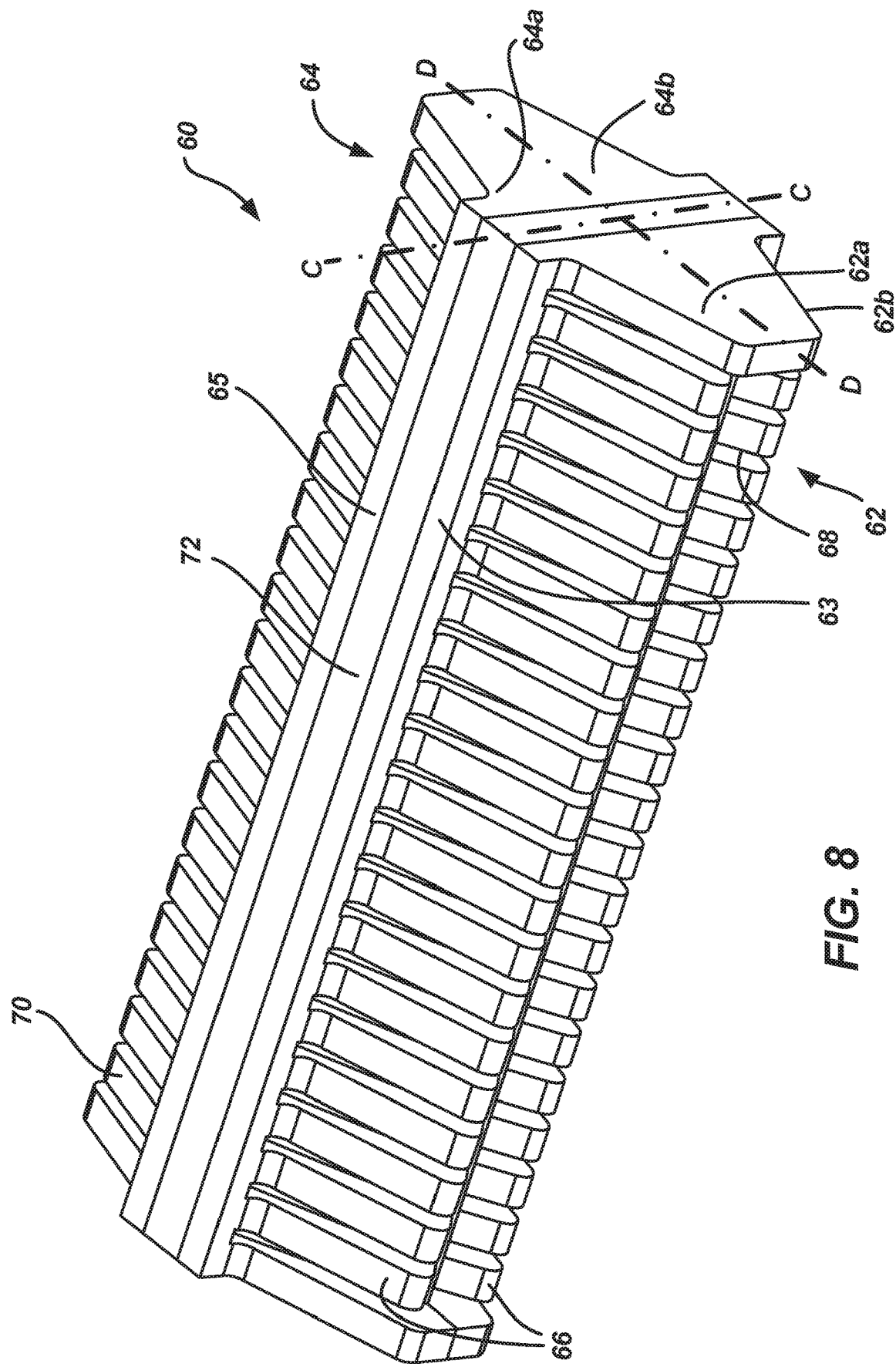
FIG. 8 is perspective view of another embodiment of a cable gel seal arrangement disclosed herein.
Figure 9:
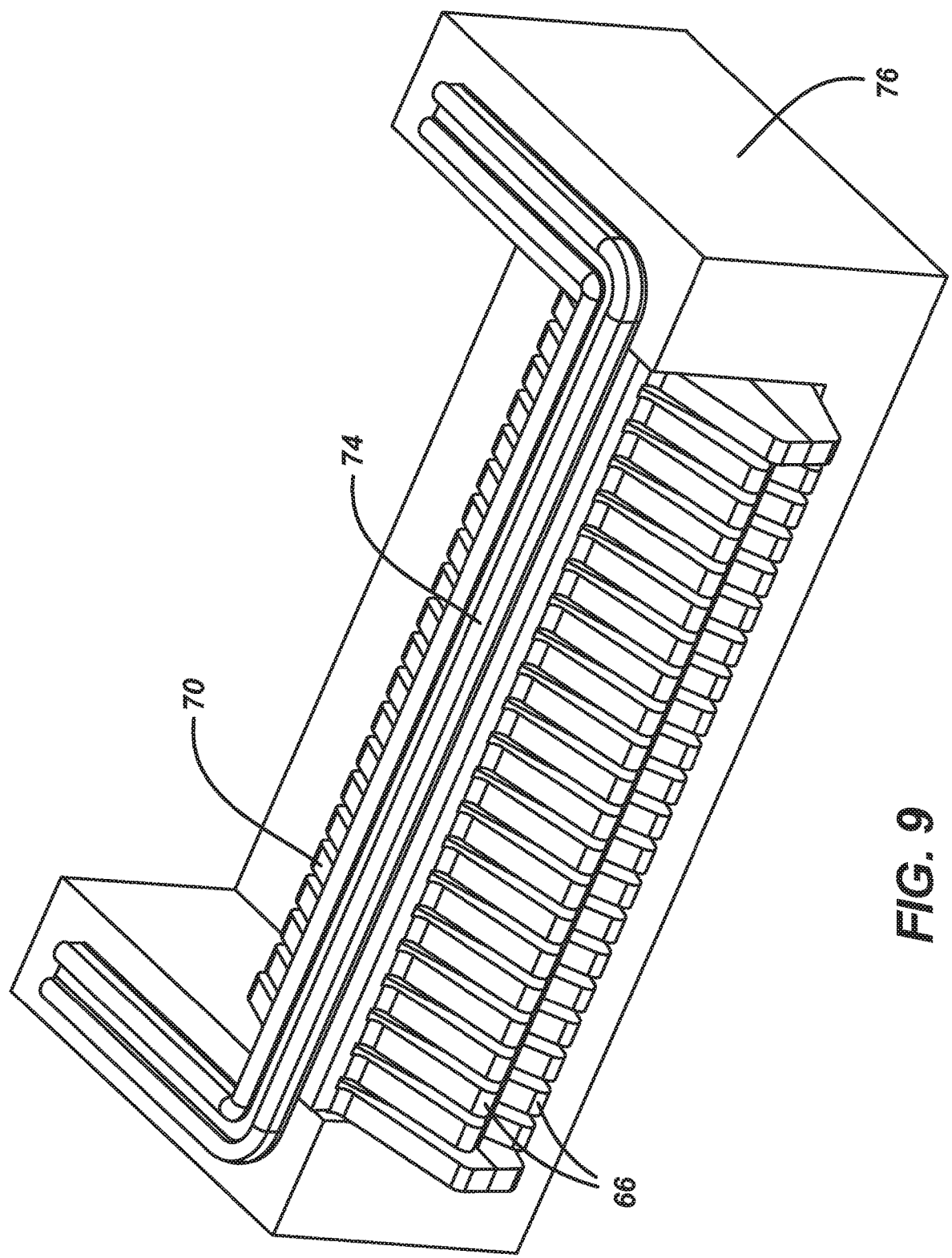
FIG. 9 shows the embodiment of the cable gel seal arrangement of FIG. 8 including a gel perimeter seal.
Figure 10:
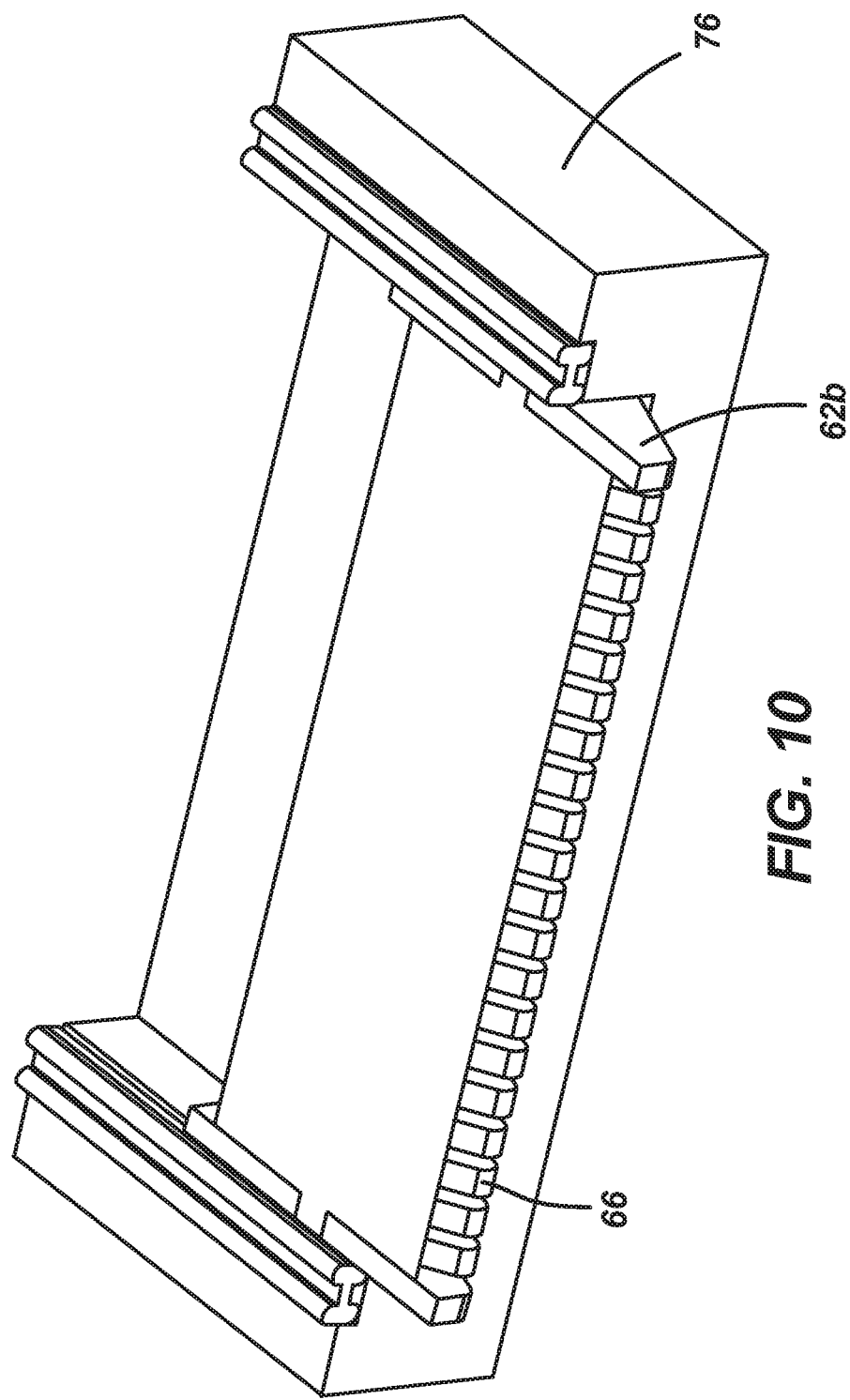
FIG. 10 depicts a cutaway view of the embodiment of the cable gel seal arrangement as shown in FIG. 9.

FIGS. 8-10 illustrate an embodiment of the a cable gel seal arrangement 60 disclosed herein having a linear configuration. This cable gel seal arrangement 60 can accommodate and seal multiple cables simultaneously. FIG. 8 shows the cable gel seal arrangement 60 fully assembled. FIG. 9 shows a longitudinal seal 74 sealing the cable gel seal arrangement 60 in an enclosure 76. FIG. 10 shows the cable gel seal arrangement 60 cut away at a part line D-D.

With reference to FIGS. 8-10, the cable gel seal arrangement 60 has a first sealing portion 62 and a second sealing portion 64. The first sealing portion 62 comprises first fingers 66. The first fingers 66 extend away from a center line C-C of the cable gel seal arrangement 60 and converge toward a first linear ridge 68 as they extend away from the center line C-C. The center line C-C is located between the first sealing portion 62 and the second sealing portion 64. Similarly, the second sealing portion 64 comprises second fingers 70. The second fingers 70 extend away from a center line C-C of the cable gel seal arrangement 60 and converge toward a second linear ridge (not shown) as they extend away from the center line C-C. A gel (not shown) is located between the first sealing portion 62 and the second sealing portion 64.

The first sealing portion 62 comprises a first upper portion 62a and a first lower portion 62b. The second sealing portion 64 comprises a second upper portion 64a and a second lower portion 64b. The first upper portion 62a and the first lower portion 62b meet at a part line D-D. The second upper portion 64a and the second lower portion 64b also meet at the part line D-D.

The first sealing portion 62 comprises a first base 63 and a first upper plurality of first fingers 66 and a first lower plurality of first fingers 66. The first upper and first lower pluralities of first fingers meet at the part line D-D. The first upper and first lower pluralities of first fingers project outwardly from the first base 63 from the center line C-C of the cable gel seal arrangement 60.

Similarly, the second sealing portion 64 comprises a second base 65 and a second upper plurality of second fingers 70 and a second lower plurality of second fingers 70 meeting at the part line D-D. The second upper and second lower pluralities of second fingers 70 project outwardly from the second base 65 from the center line C-C. The center line is located between the first base 63 and the second base 65.

The ends of each of the first fingers 66 of the first upper plurality of first fingers meet an end of a corresponding first finger 66 of the first lower plurality of first fingers 66 forming the first linear ridge 68. Similarly, the ends of each of the second fingers 70 of the second upper plurality of second fingers 70 meet an end of a corresponding second finger 70 of the second lower plurality of second fingers 70 forming the second linear ridge (not shown). The first fingers 66 flex away from the first linear ridge 68. Likewise, the second fingers 70 flex away from the second linear ridge (not shown).

As shown in FIG. 8, the cable gel seal arrangement 60 includes a gel perimeter seal 72 between the first sealing portion 62 and the second sealing portion 64.

As shown best in FIGS. 8 and 9, the first fingers 66 taper as they extend away from the center line C-C of the cable gel seal arrangement 60. In the same manner, the second fingers 70 taper as they extend away from the center line C-C of the cable gel seal arrangement 60.

The first and second fingers 66, 70 of the cable gel seal arrangement 60 can each be lined with an elastic material that extends between adjacent fingers as previously described.

The first fingers 66 can be attached to each other with a first living hinge extending between adjacent first fingers 66. In the same manner, the second fingers 70 can be attached to each other with a second living hinge extending between adjacent second fingers 70.

The linearly configured embodiment shown in FIGS. 8-10 functions similarly to conically configured embodiment depicted in FIGS. 1-7. Notably, however, the cable gel seal arrangement 60 accommodates and seals multiple cables, while the cable gel seal arrangement 20 accommodates and seals only one cable at a time.

In use, the combination of the first lower portion 62b and the second lower portion 64b act as a base for receiving one or more cables (e.g., fiber optic cables). The combination of the first upper portion 62a and the second upper portion 64a act as cover for covering the one or more cables. The cable(s) are placed into the first lower portion 62b and the second lower portion 64b. Then the first upper portion 62a and the second upper portion 64a, respectively, are placed over first lower portion 62b and the second lower portion 64b, respectively. The first and second fingers 66, 70 flex at respective first and second flex points (not shown) to accommodate the cable(s). In particular, the cable(s) cause the first and second fingers 66, 70 to flex at the respective first and second flex points. In this way the first and second fingers 66, 70 accommodate cables of various diameters and the first and second fingers 66, 70 form adjustable apertures. The first and second fingers 66, 70 having the first and second flex points provide the cable gel seal arrangement 60 with adjustability without a separate spring compensation mechanism. The first and second fingers 66, 70 having the first and second flex points integrate a "spring" feature into the cable gel seal arrangement 60.

The first and second fingers 66, 70 having the first and second flex points also eliminate any need for extra space inside the cable gel seal arrangement 60 to accommodate gel displaced by the cable. When the cable(s) displace the gel inside the cable gel seal arrangement 60, the first and second fingers 66, 70 not only accommodate the cable, but also accommodate the gel displacement. In this manner, gel is generally not displaced outside of the cable gel seal arrangement 60.

When multiple cables are sealed by the cable gel seal arrangement 60, cable spacers can be placed in the cable gel seal arrangement 60 between the cables.

In embodiments, a cable gel seal arrangement as disclosed herein includes two containment walls. The fingers project from each of the containment walls and can accommodate cables of different sizes/diameters. In an exemplary embodiment, the fingers form a cone and gel is contained within the cone such that the gel contacts an inside diameter of the cone but not an outside diameter of the cone. Each of the two containment walls can have a wrap-around configuration.

In embodiments, a cable gel seal arrangement comprises first and second containment structures. The first containment structure includes a first cone and the second containment structure includes a second cone. The first cone comprises a first set of fingers and the second cone comprises a second set of fingers. A volume of gel is contained within the first and second containment structures. The gel has at least a portion positioned within the first and second cones of the first and second containment structures.

In embodiments, a cable gel seal arrangement comprises a first gel assembly and a second gel assembly. The first gel assembly comprises a first portion of a cone. The second gel assembly comprises a second portion of the cone cooperating with the first portion of the cone to define the cone. The cone comprises a set of fingers. The cable gel seal arrangement further comprises a volume of gel inside the cone.

In embodiments, the cable gel seal arrangement can further comprise a third gel assembly and a fourth gel assembly. The third gel assembly comprises a first portion of a second cone. The fourth gel assembly comprises a second portion of the second cone cooperating with the first portion of the second cone to define the second cone. The second cone comprises a second set of fingers. The cable gel seal arrangement further comprises a second volume of gel inside the second cone.

The first portion of the cone can be half of the cone. The second portion of the cone can be another half of the cone. The first portion of the second cone can be half of the second cone. The second portion of the second cone can be another half of the second cone.

The volume of gel can be contained by the set of fingers. Similarly, the second volume of gel can be contained by the second set of fingers.

Thermoplastic Gels

Aspects of the present disclosure also relate to thermoplastic gels prepared from a composition comprising a styrene triblock copolymer and a styrene diblock copolymer exhibiting low compression set, for example, on the order of below 25%, below 20%, or below 15% (when measured at 70° C.). "Compression set" as described herein is compression set as determined according to ASTM D395, Method B (however, at 70° C. and 50% compression) with spacers for Type 1 samples and a 22 hour compression time.

The present inventors have discovered that certain additives with a particular glass transition temperature ($T_g$) advantageously segregate with the styrene end blocks of the styrene triblock copolymer and the styrene diblock copolymer, while also preventing creep at typical maximum operating temperatures (e.g., about 60° C. to about 85° C., for example, about 70° C. or about 75° C.). An exemplary method of measuring $T_g$ of additives as disclosed herein in included in the Examples.

Furthermore, the present inventors have discovered that these certain additives with a particular $T_g$ can be incorporated into the gel by melt mixing, which process advantageously does not utilize any volatile solvents. Thus, melt mixing is a method of making a thermoplastic gel that is preferable over other methods that utilize volatile solvents. Incorporation of additives into a thermoplastic gel is generally difficult without the use of solvents and the present inventors have overcome this difficulty through the inventive selection of certain additives having a particular $T_g$.

According to embodiments, a thermoplastic gel is prepared from a composition comprising: a styrene triblock copolymer; a styrene diblock copolymer; an oil extender; and an additive selected from poly(2,6-dimethyl-1,4-phenylene oxide) (PPO), a C9 resin, poly(alpha-methylstyrene), a coumarone-indene resin, and combinations thereof. In these embodiments, the additive has a $T_g$ from about 95° C. to about 200° C. In other embodiments, the additive has a $T_g$ from about 100° C. to about 200° C.

In embodiments, the additive is PPO with a $T_g$ from about 130° C. to about 185° C. The $T_g$ of the PPO can be from about 130° C. to about 165° C. For example, the $T_g$ of the PPO can be about 164° C. to about 165° C. As another example, the $T_g$ of the PPO can be about 135° C. to about 136° C.

Generally, the composition comprises at most about 30 wt % of the styrene triblock copolymer and styrene diblock copolymer in combination. In embodiments, the composition comprises at most about 20 wt % styrene triblock copolymer and styrene diblock copolymer in combination. In other embodiments, the composition comprises at most about 15 wt % styrene triblock copolymer and styrene diblock copolymer in combination.

In some embodiments, the composition comprises from about 1 wt % to about 25 wt % of the styrene triblock copolymer. In other embodiments, the composition comprises from about 3 wt % to about 20 wt % of the styrene triblock copolymer. In certain embodiments, the composition comprises from about 3 wt % to about 15 wt % of the styrene triblock copolymer. In yet other embodiments, the composition comprises from about 3 wt % to about 10 wt % of the styrene triblock copolymer.

When the composition comprises at most about 30 wt % of the styrene triblock copolymer and the styrene diblock copolymer in combination, the composition can comprise from about 5 wt % to about 29 wt % of the styrene diblock copolymer; from about 10 wt % to about 27 wt % of the styrene diblock copolymer; or from about 20 wt % to about 27 wt % of the styrene diblock copolymer. When the composition comprises at most about 20 wt % of the styrene triblock copolymer and the styrene diblock copolymer in combination, the composition can comprise from about 10 wt % to about 17 wt % of the styrene diblock copolymer. When the composition comprises at most about 15 wt % of the styrene triblock copolymer and the styrene diblock copolymer in combination, the composition can comprise from about 5 wt % to about 12 wt % styrene diblock copolymer. In some embodiments, the composition comprises from about 1 wt % to about 16 wt % of the styrene diblock copolymer.

The composition can comprise from about 60 wt % to about 90 wt % of the oil extender. The oil extender may be selected from oils conventionally used to extend copolymer materials and are known in the art. The oil may be a hydrocarbon oil such as paraffinic oil, naphthenic oil, or polyalphaolefin (PAO) oil such as polydecene, polydodecene, or polytetradecene; a synthetic oil such as polybutene or polypropene oil, and mixtures thereof. For example, the oil extender can be a mixture of a non-aromatic paraffin and a naphthenic hydrocarbon oil.

In some embodiments, the composition comprises from about 0.25 wt % to about 15 wt % of the additive. In other embodiments, the composition comprises from about 0.25 wt % to about 13 wt % of the additive. For example, the composition can comprise from about 0.25 wt % to about 1 wt % of the additive. The composition can comprise from about 2 wt % to about 5.5 wt % of the additive. The composition can comprise from about 1.75 wt % to about 12 wt % of the additive. The composition can comprise from about 2.5 wt % to about 10.5 wt % of the additive. The composition can comprise from about 4 wt % to about 10 wt % of the additive.

According to embodiments, the additive is PPO. According to other embodiments, the additive is the C9 resin. According to yet other embodiments, the additive is poly(alpha-methylstyrene). According to some embodiments, the additive is the coumarone-indene resin. In certain embodiments, the $T_g$ of the C9 resin is from about 95° C. to about 105° C. For example, the $T_g$ of the C9 resin can be about 99° C.; about 102° C.; or about 112° C. to about 113° C. In certain embodiments, the $T_g$ of the poly(alpha-methylstyrene) is from about 105° C. to about 115° C. For example, the $T_g$ of the poly(alpha-methylstyrene) can be about 107° C. or about 113° C. In certain embodiments, the $T_g$ of the coumarone-indene resin is from about 95° C. to about 185° C. In certain embodiments, the $T_g$ of the coumarone-indene resin is from about 105° C. to about 185° C. In certain embodiments, the $T_g$ of the coumarone-indene resin is from about 105° C. to about 115° C. For example, the $T_g$ of the coumarone-indene resin can be about 112° C. to about 113° C.

The thermoplastic gels disclosed herein can advantageously be prepared by a melt mixing process. Thus, the present disclosure also relates to a method of making a thermoplastic gel. The method comprises providing the styrene triblock copolymer, the styrene diblock copolymer, the oil extender, and an additive (e.g., the PPO, the C9 resin, the poly(alpha-methylstyrene), or the coumarone-indene resin with the appropriate $T_g$). The method further comprises melt mixing the styrene triblock copolymer, the styrene diblock copolymer, the oil extender, and the additive. Melt mixing is generally known in the art and involves melting and mixing the components at a temperature sufficient to melt each of the components (i.e., a temperature equal to or greater than the melting temperature of the highest melting component).

In certain embodiments, the thermoplastic gel has a compression set below 25% at about 70° C. In some embodiments, the thermoplastic gel has a compression set below 20% at about 70° C. In other embodiments, the thermoplastic gel has a compression set below 15% at about 70° C.

EXAMPLES

Figure 11:
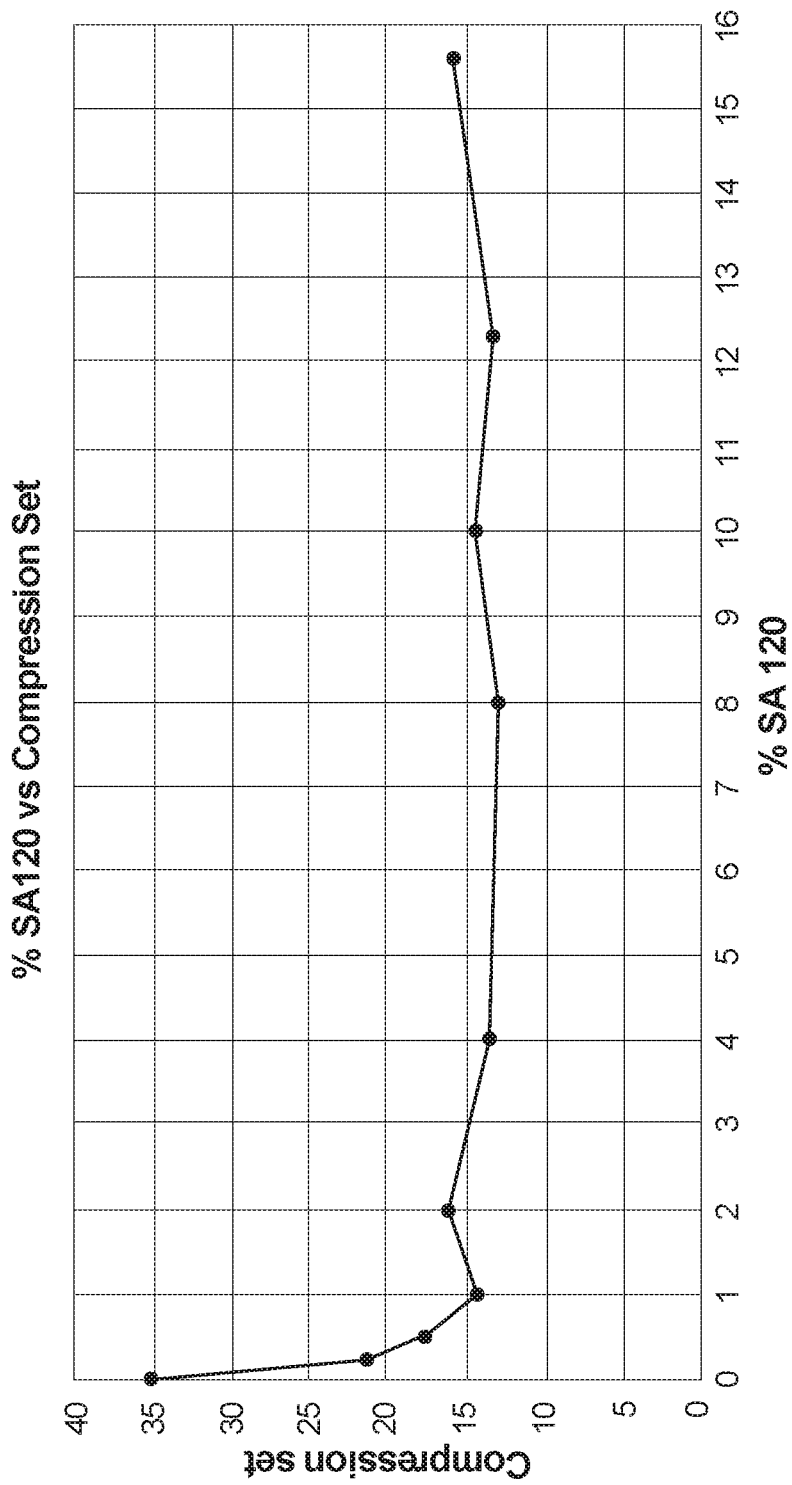
FIG. 11 shows compression set of an exemplary thermoplastic gel prepared from a composition including poly(2,6-dimethyl-1,4-phenylene oxide) (Sabic NORYL™ SA120) as a function of poly(2,6-dimethyl-1,4-phenylene oxide) content in the composition.

Mixtures of styrene triblock copolymer (Kraton™ G1651), styrene diblock copolymer (Kraton™ G1701), the oil extender, and Sabic NORYL™ SA120 PPO were prepared with various weight percentage loading levels of the PPO. Thermoplastic gel were then prepared therefrom by melt mixing. Compression set of the thermoplastic gel was measured at the various weight percentage loading levels according to ASTM D395, Method B (however, at 70° C. and 50% compression) with spacers for Type 1 samples and a 22 hour compression time. FIG. 11 shows compression set as a function of weight percent of PPO in the composition.

FIG. 11 shows compression set below 25% with 0.25 wt % PPO. Compression set below 15% was achieved with only 1 wt % PPO.

Figure 12:
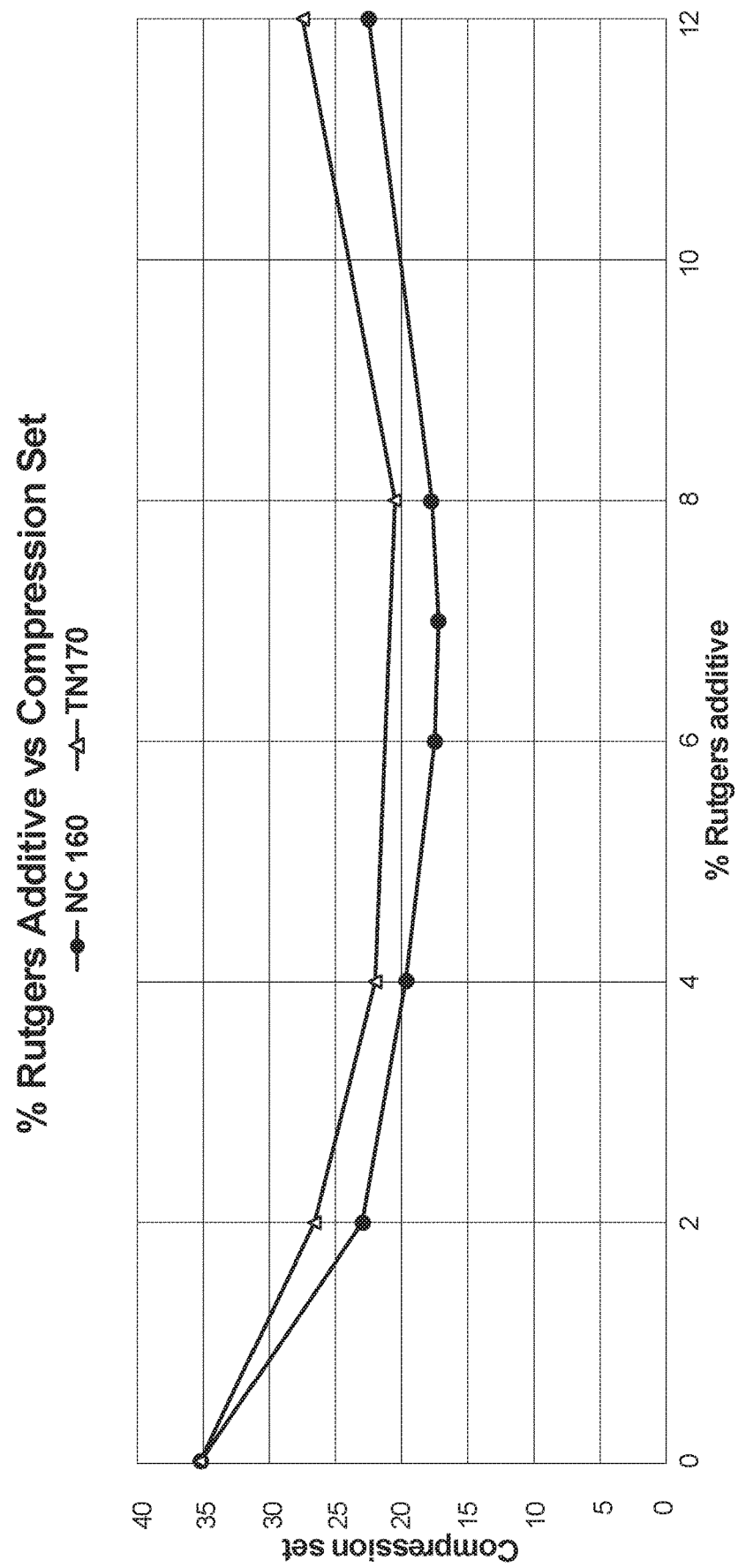
FIG. 12 shows compression set of exemplary thermoplastic gels prepared from compositions including a C9 resin (Rutgers Novares TN 170) or a coumarone-indene resin (Rutgers Novares C 160) as a function of the additive content in the compositions.

Mixtures of styrene triblock copolymer (Kraton™ G1651), styrene diblock copolymer (Kraton™ G1701), oil extender, and Rütgers Novares C 160 coumarone-indene resin were prepared with various weight percentage loading levels of the coumarone-indene resin. Thermoplastic gels were then prepared therefrom by melt mixing. Mixtures of styrene triblock copolymer (Kraton™ G1651), styrene diblock copolymer (Kraton™ G1701), oil extender, and Rütgers Novares TN 170 C9 resin were also prepared with various weight percentage loading levels of the C9 resin. Again, thermoplastic gels were prepared therefrom by melt mixing. Compression set of thermoplastic gels was measured at the various weight percentage loading levels according to ASTM D395, Method B (however, at 70° C. and 50% compression) with spacers for Type 1 samples and a 22 hour compression time. FIG. 12 shows compression set as a function of weight percent of additive in the composition.

FIG. 12 shows both the coumarone-indene resin and the C9 resin also provide relatively low compression set. In particular, for the exemplary thermoplastic gel containing the coumarone-indene resin, 2 wt % of the additive in the composition resulted in a compression set less than 25% and 4 wt % of the additive in the composition resulted in a compression set less than 20%. For the exemplary thermoplastic gel containing the C9 resin, 4 wt % of the additive in the composition provided a compression set less than 25%.

Figure 13:
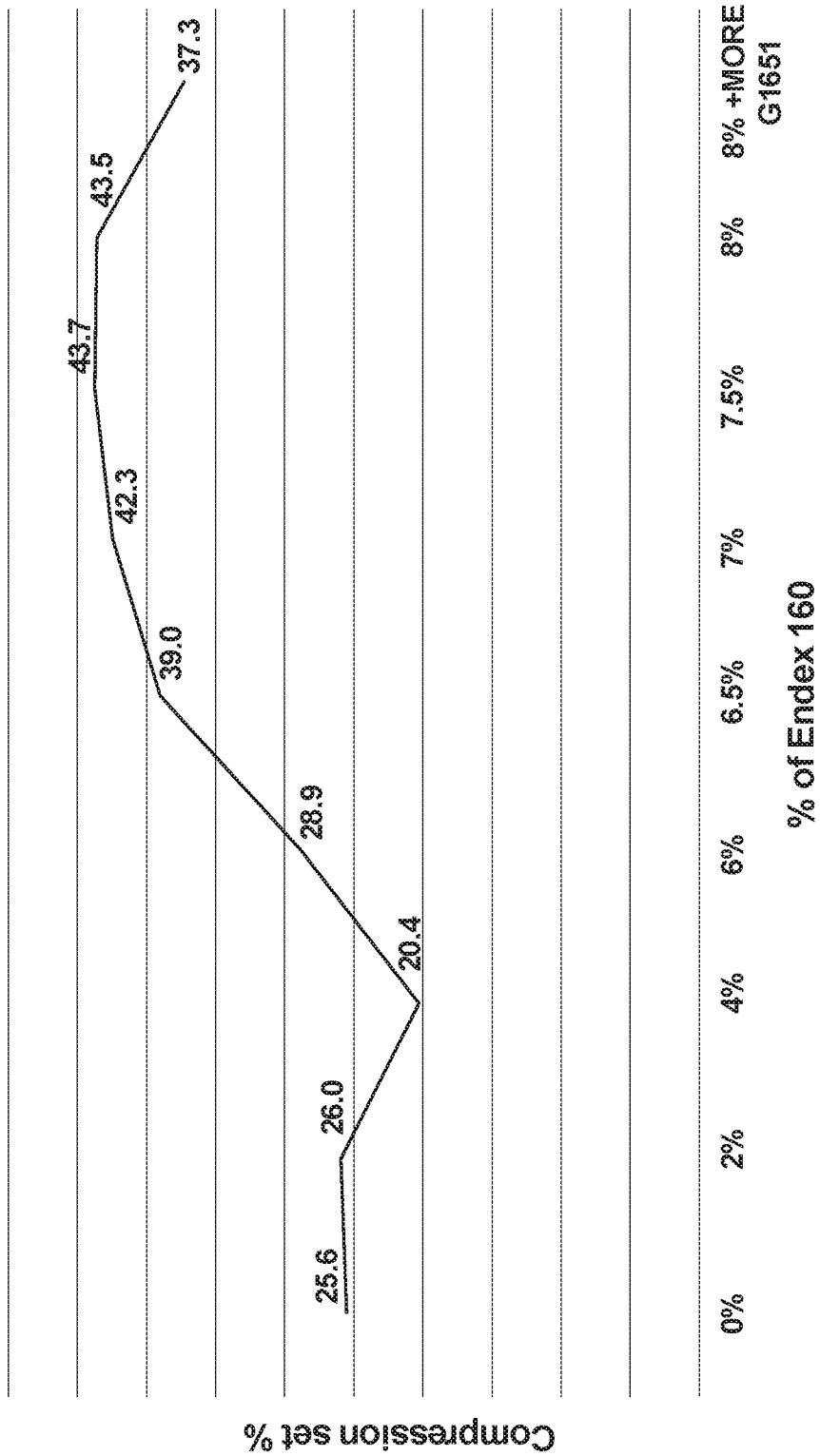
FIG. 13 shows compression set of an exemplary thermoplastic gel prepared from a composition including poly(alpha-methylstyrene) (Endex™ 160 from Eastman Chemical Company) as a function of the poly(alpha-methylstyrene) content in the composition.

Mixtures of styrene triblock copolymer (Kraton™ G1651), styrene diblock copolymer (Kraton™ G1701), oil extender, and Endex™ 160 poly(alpha-methylstyrene) were prepared with various weight percentage loading levels of the poly(alpha-methylstyrene). Thermoplastic gels were prepared therefrom by melt mixing. Compression set of thermoplastic gel was measured at the various weight percentage loading levels according to ASTM D395, Method B (however, at 70° C. and 50% compression) with spacers for Type 1 samples and a 22 hour compression time. FIG. 13 shows compression set as a function of weight percent of poly(alpha-methylstyrene) in the composition.

As shown in FIG. 13, 4 wt % poly(alpha-methylstyrene) in the composition provided a compression set of less than 25%.

Glass Transition Temperature ($T_g$) Measurement $T_g$ can be measured according to the following method. A Perkin Elmer DSC 8500 can be used. Testing can be conducted in the instrument calibrated in accordance with ASTM D3418-08 using indium heat flow and temperature standards. Testing can be conducted in accordance with the following. Avoid grinding samples and test flat solid samples only. Make sure that the material completely covers the bottom of the pan to ensure good thermal contact. Calculate glass transition temperatures from the second heat cycles, as the second heat cycle will evaluate the inherent properties of the material. Nominally 5-10 mg can be cut from samples and placed in a 40 μL crimped aluminum DSC pan crimped with a pierced lid. Samples can be tested under an inert nitrogen purge of 20 mL/min. $T_g$ can be determined from the second heat cycles of the standard differential scanning calorimetry (DSC) test.

From the foregoing detailed description, it will be evident that modifications and variations can be made to the cable gel seal arrangements disclosed herein and the thermoplastic gels disclosed herein without departing from the spirit or scope of the disclosure.

REFERENCE LETTERS/NUMBERS center line A-A
part line B-B
center line C-C
part line D-D
cable gel seal arrangement 20
first sealing portion 22
first upper portion 22a
first lower portion 22b
second sealing portion 24
second upper portion 24a
second lower portion 24b
gel 26
first finger 28
first apex 30
second finger 32
second apex 34
first adjustable aperture 38
second adjustable aperture 39
first gel containment cone 40
first base 42
second gel containment cone 44
second base 46
first flex point 48
second flex point 50
gel perimeter seal 52
elastic material 54
cable gel seal arrangement 60
first sealing portion 62
first upper portion 62a
first lower portion 62b
first base 63
second sealing portion 64
second upper portion 64a
second lower portion 64b
second base 65
first finger 66
first linear ridge 68
second finger 70
gel perimeter seal 72
longitudinal seal 74
enclosure 76
cable 78
cable 80

What is claimed is:

1. A thermoplastic gel prepared from a composition comprising:
 1 wt % to 25 wt % of a styrene triblock copolymer;
 1 wt % to 16 wt % of a styrene diblock copolymer;
 60 wt % to 90 wt % of an oil extender; and
 0.25 wt % to 15 wt % of an additive, wherein the additive is selected from the group consisting of poly(2,6- dimethyl-1,4-phenylene oxide), poly(alpha-methylstyrene), and combinations thereof,
wherein the additive has a Tg from about 95° C. to about 200° C., and wherein the gel has a compression set below 25% at about 70° C.

2. The thermoplastic gel of claim 1, wherein the additive is poly(2,6-dimethyl-1,4-phenylene oxide) and the $T_g$ is from about 130° C. to about 185° C.

3. The thermoplastic gel of claim 1, wherein the additive is poly(2,6-dimethyl-1,4-phenylene oxide) and the $T_g$ is from about 130° C. to about 165° C.

4. The thermoplastic gel of claim 1, wherein the additive is poly(2,6-dimethyl-1,4-phenylene oxide) and the $T_g$ is about 164° C. to about 165° C.

5. The thermoplastic gel of claim 1, wherein
the styrene triblock copolymer is selected from poly(styrene-butadiene-styrene), poly(styrene-ethylene/butylene-styrene), poly(styrene-ethylene/propylene-styrene), poly(styrene-ethylene/ethylene-propylene-styrene), and combinations thereof; and
the styrene diblock copolymer is selected from poly(styrene-ethylene/propylene), poly(styrene-ethylene/butylene), and combinations thereof.

6. A method of making the thermoplastic gel of claim 1, comprising:
providing the styrene triblock copolymer, the styrene diblock copolymer, the oil extender, and the additive; and
melt mixing the styrene triblock copolymer, the styrene diblock copolymer, the oil extender, and the additive.

7. The thermoplastic gel of claim 1, wherein the composition comprises from about 3 wt % to about 20 wt % of the styrene triblock copolymer.

8. The thermoplastic gel of claim 7, wherein the composition comprises from about 3 wt % to about 15 wt % of the styrene triblock copolymer.

9. The thermoplastic gel of claim 1, wherein the additive is poly(2,6-dimethyl-1,4-phenylene oxide) and the composition comprises from about 0.25 wt % to about 15 wt % poly(2,6-dimethyl-1,4-phenylene oxide).

10. The thermoplastic gel of claim 9, wherein the composition comprises from about 0.25 wt % to about 13 wt % poly(2,6-dimethyl-1,4-phenylene oxide).

11. The thermoplastic gel of claim 1, wherein the additive is poly(2,6-dimethyl-1,4-phenylene oxide) and the gel has a compression set below 20% at about 70° C.

12. The thermoplastic gel of claim 11, wherein the additive is poly(2,6-dimethyl-1,4-phenylene oxide) and the gel has a compression set below 15% at about 70° C.

13. The thermoplastic gel of claim 1, wherein the composition comprises from about 60 wt % to about 90 wt % of a hydrocarbon oil extender.

14. The thermoplastic gel of claim 1, wherein the additive is poly(2,6-dimethyl-1,4-phenylene oxide).

15. The thermoplastic gel of claim 1, wherein the additive is the C9 resin.

16. The thermoplastic gel of claim 1, wherein the additive is poly(alpha-methylstyrene).

17. The thermoplastic gel of claim 1, wherein the additive is the coumarone-indene resin.

18. The thermoplastic gel of claim 15, wherein the gel has a compression set below 20% at about 70° C.

19. The thermoplastic gel of claim 17, wherein the gel has a compression set below 20% at about 70° C.

20. The thermoplastic gel of claim 1, prepared from a composition comprising:
3 wt % to about 20 wt % of the styrene triblock copolymer;
5 wt % to about 12 wt % of the styrene diblock copolymer;
60 wt % to 90 wt % of the oil extender; and
0.25 wt % to about 13 wt % of the additive.

21. The thermoplastic gel of claim 1, wherein the composition comprises at most about 30 wt % of the styrene triblock copolymer and styrene diblock copolymer in combination.

22. A thermoplastic gel prepared from a composition comprising:
a styrene triblock copolymer;
a styrene diblock copolymer;
an oil extender; and
a poly(2,6-dimethyl-1,4-phenylene oxide) additive,
wherein the additive has a $T_g$ from about 95° C. to about 200° C.

23. The thermoplastic gel of claim 22, wherein the poly(2,6-dimethyl-1,4-phenylene oxide) additive has a $T_g$ is from about 130° C. to about 185° C.

24. The thermoplastic gel of claim 22, wherein the poly(2,6-dimethyl-1,4-phenylene oxide) additive has a $T_g$ is from about 130° C. to about 165° C.

25. The thermoplastic gel of claim 22, wherein the poly(2,6-dimethyl-1,4-phenylene oxide) additive has a $T_g$ is from about 164° C. to about 165° C.

26. The thermoplastic gel of claim 22, wherein the composition comprises from about 0.25 wt % to about 15 wt % poly(2,6-dimethyl-1,4-phenylene oxide).

27. The thermoplastic gel of claim 26, wherein the composition comprises from about 0.25 wt % to about 13 wt % poly(2,6-dimethyl-1,4-phenylene oxide).

28. The thermoplastic gel of claim 27, wherein the gel has a compression set below 25% at about 70° C.

29. The thermoplastic gel of claim 28, wherein the gel has a compression set below 20% at about 70° C.

30. The thermoplastic gel of claim 29, wherein the gel has a compression set below 15% at about 70° C.

31. A thermoplastic gel prepared from a composition comprising:
a styrene triblock copolymer;
a styrene diblock copolymer;
an oil extender; and
a poly(alpha-methylstyrene) additive,
wherein the additive has a $T_g$ from about 95° C. to about 200° C.

32. The thermoplastic gel of claim 31, wherein the gel has a compression set below 25% at about 70° C.

* * * * *